United States Patent
Wuebbolt-Gorbatenko et al.

(10) Patent No.: US 12,157,522 B2
(45) Date of Patent: Dec. 3, 2024

(54) ELECTROMECHANICAL ACTUATOR AND REAR-AXLE STEERING SYSTEM

(71) Applicant: Schaeffler Technologies AG & Co. KG, Herzogenaurach (DE)

(72) Inventors: Benjamin Wuebbolt-Gorbatenko, Erlangen (DE); Daniel Faber, Nuremberg (DE); Alexander Hausmann, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 948 days.

(21) Appl. No.: 17/258,313

(22) PCT Filed: May 3, 2019

(86) PCT No.: PCT/DE2019/100397
§ 371 (c)(1),
(2) Date: Jan. 6, 2021

(87) PCT Pub. No.: WO2020/011302
PCT Pub. Date: Jan. 16, 2020

(65) Prior Publication Data
US 2021/0269085 A1    Sep. 2, 2021

(30) Foreign Application Priority Data
Jul. 12, 2018    (DE) ............ 10 2018 116 867.5

(51) Int. Cl.
*B62D 5/04*    (2006.01)
*F16C 19/18*   (2006.01)
(Continued)

(52) U.S. Cl.
CPC ......... *B62D 5/0445* (2013.01); *B62D 5/0424* (2013.01); *B62D 5/0451* (2013.01);
(Continued)

(58) Field of Classification Search
CPC .. B62D 5/0445; B62D 5/0424; B62D 5/0451; F16C 19/181; F16C 2326/01; F16H 25/2006; F16H 25/2252; F16H 2025/2031
(Continued)

(56) References Cited

U.S. PATENT DOCUMENTS 3,861,221 A * 1/1975 Stanley ............... F16H 25/2266
                                                            74/25
5,836,208 A * 11/1998 Dietrich ............. F16H 25/2252
                                                          74/424.92
(Continued)

FOREIGN PATENT DOCUMENTS

CH    669436 A5    3/1989
CN  102582676 A    7/2012
(Continued)

OTHER PUBLICATIONS

Gb914610a, Anderson Co, Jan. 2, 1963 provided as a translation of DE1198157B.

*Primary Examiner* — T. Scott Fix (57) ABSTRACT

An actuator for rear-axle steering system of a motor vehicle comprises a threaded spindle (2) which is surrounded by planets (21), each provided with a corresponding profiling (8), wherein the planets (21) are guided in a driven cage (13) and, via further profiling (25), contact a nut (4) that surrounds areas of the planets (21) provided with said profiling (8) and is supported with respect to the cage (13) by rolling bearings (14), and wherein the cage (13) is mounted in a housing (20) by means of further rolling bearings (30, 31, 32, 33) and is non-rotatably connected to an output-side component (12, 34) of a further transmission (10, 11, 12).

19 Claims, 7 Drawing Sheets

(51) Int. Cl.
*F16H 25/20* (2006.01)
*F16H 25/22* (2006.01)

(52) U.S. Cl.
CPC ....... *F16C 19/181* (2013.01); *F16H 25/2006* (2013.01); *F16H 25/2252* (2013.01); *F16C 2326/01* (2013.01); *F16H 2025/2031* (2013.01); *F16H 2025/2081* (2013.01); *F16H 2025/2087* (2013.01); *F16H 2025/2096* (2013.01)

(58) Field of Classification Search
USPC .......................................... 74/424.92, 89.23
See application file for complete search history.

(56) References Cited

U.S. PATENT DOCUMENTS

| | | | | |
|---|---|---|---|---|
| 8,082,818 | B2 * | 12/2011 | Sugitani | F16H 25/2252 74/424.91 |
| 2005/0160856 | A1 * | 7/2005 | Sugitani | F16H 25/2252 74/424.92 |
| 2005/0247150 | A1 * | 11/2005 | Tsubono | F16H 25/2266 74/424.92 |
| 2011/0000330 | A1 * | 1/2011 | Doeppling | F16C 33/60 29/898.07 |
| 2013/0068059 | A1 * | 3/2013 | Kurz | F16H 25/2252 74/424.92 |

FOREIGN PATENT DOCUMENTS

| | | | | |
|---|---|---|---|---|
| CN | 105793614 A * | 7/2016 | ............ | F16D 23/12 |
| CN | 106321761 A | 1/2017 | | |
| DE | 1198157 B | 8/1965 | | |
| DE | 19540634 C1 | 3/1997 | | |
| DE | 102005023250 A1 | 11/2006 | | |
| DE | 102010055416 A1 * | 6/2012 | ............... | B60S 9/08 |
| DE | 102011087560 A1 | 6/2013 | | |
| DE | 102012203113 A1 | 8/2013 | | |
| DE | 102015206735 B3 | 5/2016 | | |
| DE | 102015212333 A1 * | 1/2017 | ............ | F16H 25/22 |
| DE | 102015224662 A1 | 6/2017 | | |
| DE | 102015224775 A1 | 6/2017 | | |
| DE | 102017128707 A1 | 6/2018 | | |
| DE | 102017112710 A1 | 12/2018 | | |
| EP | 0229744 A1 | 7/1987 | | |
| EP | 2947348 A1 | 11/2015 | | |
| EP | 3632773 A1 * | 4/2020 | ............ | B21D 22/02 |
| FR | 1494173 A | 9/1967 | | |
| FR | 3021086 A1 | 11/2015 | | |
| JP | 2014234102 A | 12/2014 | | |
| RU | 2204070 C1 | 5/2003 | | |
| WO | 2005023623 A1 | 3/2005 | | |

* cited by examiner

ELECTROMECHANICAL ACTUATOR AND REAR-AXLE STEERING SYSTEM

CROSS-REFERENCE TO RELATED APPLICATIONS

This application is the U.S. National Phase of PCT Appln. No. PCT/DE2019/100397 filed May 3, 2019, which claims priority to DE 10 2018 116 867.5 filed Jul. 12, 2018, the entire disclosures of which are incorporated by reference herein.

TECHNICAL FIELD

The disclosure relates to an electromechanical actuator which converts a rotary movement into a linear movement, wherein a threaded spindle is contacted by multiple planets, designed as rolling bodies, and a component in which the planets are mounted is rotatively driven. The disclosure also relates to a rear-axle steering system having such an actuator.

BACKGROUND

A device for converting a rotary movement into an axial movement, which comprises rolling elements rolling on a threaded spindle, is known, for example, from DE 195 40 634 C1. The individual rolling elements of this device are supported by guide rings and by ball bearings arranged between the guide rings and a spindle nut. Here, the rolling elements are arranged at a fixed predetermined distance relative to the spindle nut and from one another allowing for, among other things, an axial force absorption on the spindle nut via the rolling elements, the guide rings, and the ball bearings. In the spindle nut and in a cover of the spindle nut, there are further ball bearings which rotatably support the rolling elements and keep the distance between the rolling elements, also known as roller elements, constant. In the case of a rotary drive of either the spindle nut or the threaded spindle of the known device, the rotation of the relevant part is converted into an axial movement of the other part, which is free of pitch errors.

Another device for converting a rotation into a linear movement is disclosed in FR 1.494.173 A. In this case too, a threaded spindle is surrounded by several rolling elements that function as planets. The planets are mounted in an outer sleeve that can be used as a transmission output element. In addition, an inner, likewise sleeve-shaped part is provided contacting the planets on the one hand and, on the other hand, interacting with the outer sleeve via axial ball bearings.

A rotary-linear transmission described in DE 1 198 157 has a rotatable cage through which a threaded spindle extends, wherein multiple rolling elements referred to as bearing elements are mounted in the cage and engage in threads of the spindle. The transmission further comprises an annular part which surrounds the planets in rolling contact therewith, whereby the planets are kept in contact with the threaded spindle. There is no provision for any axial force transmission between the annular part and the cage of the transmission.

SUMMARY

It is desirable to propose an electromechanical actuator that has been further developed with respect to the prior art, in particular for a rear-axle steering system of a motor vehicle, which is characterized by an operation free from pitch errors, a manufacturing-friendly construction, and a particularly favorable relationship between the installation space required and the transferable forces and torques.

This is achieved by an electromechanical actuator as described herein. The actuator is suitable for use in a rear-axle steering system and comprises a threaded spindle which is surrounded by planets, each having a corresponding profile, i.e., one that engages into the thread of the spindle, wherein the planets are guided in a driven cage. Further profiling of the planets contacts a nut which surrounds the areas of the planets that are provided with said profiling and contact the threaded spindle and which is supported by rolling bearings with respect to the cage. The cage is mounted in a housing by means of further rolling bearings and is non-rotatably connected to an output-side component of a further transmission.

The cage mounted on rolling bearings in the housing thus has a dual function, namely the function of a rotating input-side element in a rotary-linear gear on the one hand and, on the other hand, a function on the output side of a further gear, in particular a rotary-rotary transmission designed as a reduction gear. When the actuator is installed in a rear-axle steering system of a vehicle, the actuator is designed for the linear deflection of at least one connection element connected to the threaded spindle and provided for movable coupling with a toe link.

The nut, which surrounds the planets, is arranged inside the cage and preferably comprises two nut halves that can be braced against one another. The term "nut halves" does not necessarily imply that both nut halves are the same size. Each nut half can be connected to a separate biasing nut, wherein the bearings provided for mounting the nut in the cage are supported on the biasing nuts.

In a preferred embodiment, the bearings provided for mounting the nut in the cage are designed as angular contact rolling bearings, in particular angular contact roller bearings or angular contact ball bearings, wherein each of the two angular contact rolling bearings supports the nut in the cage in the radial direction and in exactly one axial direction. The two angular contact rolling bearings together form a rolling bearing in an X arrangement. This means that the pressure lines extending through the rolling elements, i.e., rollers or balls, of the two angular contact rolling bearings cross in the shape of an X.

According to one possible embodiment, the further transmission, i.e., the rotary-rotary transmission, of the actuator is designed as a continuously variable transmission, in particular a belt transmission. Alternatively, the cage can also be driven via a spur gear. In both cases, the shaft of the electric motor assigned to the actuator is spaced apart parallel from the central axis of the threaded spindle. The electric motor provided for actuating the rotary-rotary transmission can be arranged within the same housing in which the cage is rotatably mounted. Rolling bearings are preferably used to mount the cage in the housing. This can be, for example, angular contact rolling bearings or a combination of radial rolling bearings and axial rolling bearings.

According to one possible design, the rotary-rotary transmission, which is designed as a belt transmission, comprises an output element, in particular in the form of a belt pulley, surrounding a lateral surface of the cage. The cage itself can also be designed as a belt pulley.

According to an alternative design, the continuous variable transmission comprises an output element which is connected, via a flange or a shaft, to a cage ring guiding the planets, which is assigned to the cage guiding the planets, and is offset in the axial direction relative to the cage ring.

In the rotatively driven cage, the planets are, for example, mounted with slide bearings. Rolling bearings for the planets are also possible. Provided for the transmission of axial forces between the spindle and the cage and further to the housing are not primarily the sliding or rolling bearings with which the planets are mounted, but rather the bearings supporting the nut in the cage, which are preferably designed as angular contact rolling bearings.

In any case, every rotation of the cage is converted into feed of the threaded spindle with the same gradient. Possible slippage of the planets on the threaded spindle is irrelevant here. In a preferred embodiment, the rotary-rotary transmission connected upstream of the rotary-linear transmission also allows a clear association between the angular position of the drive element and the angular position of the output element, the latter angular position being identical to the angular position of the cage. The positioning of the threaded spindle can thus be simply detected by an angle sensor. The finest resolution can be achieved here if the angle sensor detects the angular position of the motor shaft of the electric motor of the actuator.

The threaded spindle, displaceable by means of the actuator, can have a single or multiple thread.

BRIEF DESCRIPTION OF THE DRAWINGS

Several exemplary embodiments are explained in more detail below with reference to a drawing. In the figures.

DETAILED DESCRIPTION

Unless otherwise stated, the following explanations relate to all exemplary embodiments. Parts that correspond to one another or have the same effect in principle are identified by the same reference signs in all figures.

An actuator identified overall with the reference sign 1, generally also referred to as a drive unit, comprises an electric motor 9 as well as a two-stage transmission, the first transmission stage of which is designed as a rotary-rotary transmission and the second transmission stage, as a rotary-linear transmission. The output element of the second transmission stage is a threaded spindle 2, also referred to as a spindle for short, the thread of which is denoted by 3. The spindle 2 can be non-rotably displaced, wherein it is connected to connecting elements 5, 6 which are only visible in FIG. 4 and which are each provided with a toe link of a rear-axle steering system for articulated coupling.

A nut 4 surrounding the spindle 2 is provided for the transmission of forces in the axial direction, i.e., in the direction of the central axis of the spindle 2 designated by M, but not for the transmission of torque. In the nut 4, which is also referred to as a ring gear, several planets 21 roll off, each of which has a multi-stepped shape. The central portion of each planet is denoted by 7 and determines the maximum diameter of the planet 21. A profile 8 of the central section 7 is designed as a groove profile and designed to correspond to the contour of the thread 3. Two comparatively thin, likewise essentially cylindrical side portions 24 adjoin the central portion 7 of each planet 21. The profiling of the side sections 24 is denoted by 25. The profiling 25, like the profiling 8, also has the form of grooves without a pitch. The profiling 25 engages in correspondingly contoured profiling of two nut halves 18, 19. The nut halves 18, 19 are each fixedly connected to a biasing nut 15, 16, wherein the biasing nut 15, 16 surrounds the associated nut half 18, 19 in an annular manner. By adjusting the bias between the nut halves 18, 19, play between the nut 4 and the planet 21 can be avoided. At the same time, by adjusting the biasing nuts 15, 16, the play of bearings 14 can be adjusted, in particular reduced to zero. Each bearing 14 is designed as an angular contact roller bearing and is arranged between a biasing nut 15, 16 and a cage designated by 13, having a sleeve shape.

The cage 13 has several receptacles 27 in which pins 26 are mounted, which represent the end faces of the planets 21. The bearings of the pins 26 of the planets 21 in the receptacles 27 are designed as sliding contact bearings.

The cage 13 represents the input-side element of the second transmission stage, i.e., of the rotary-linear transmission. At the same time, the cage 13 is non-rotatably connected to a belt pulley 12, which is the output-side element of the first transmission stage, that is to say, of the rotary-rotary transmission designed as a reduction gear. A belt 11, generally referred to as a looping means, and a pinion 10 as an element on the input side are also assigned to the latter transmission. The pinion 10 is fixedly connected to the motor shaft of the electric motor 9.

The entire two-stage transmission arrangement as well as the electric motor 9 are located in a housing 20. The cage 13 is mounted in the housing 20 by means of radial bearings 30, 31 and axial bearings 32, 33. The bearings 30, 31, 32, 33 mentioned are rolling bearings in the exemplary embodiments. In a manner not shown, the function of the total of four bearings 30, 31, 32, 33 can be replaced by a rolling bearing with fewer components, for example a combination of two angular contact rolling bearings.

In the exemplary embodiments, the bearings 14, which mount the nut 4 in the cage 13, have rollers 35 as rolling elements which roll off on angled bearing washers 36, 37 and are guided in a cage 38. Here, the angled inner bearing washers 36 engage with a tapered surface 47 of the nut 4 and are fixedly connected to the nut 4, whereas the angled outer bearing washers 37 engage a tapered surface 46 of the cage 13 and are fixedly arranged in the cage 13.

Figure 1:
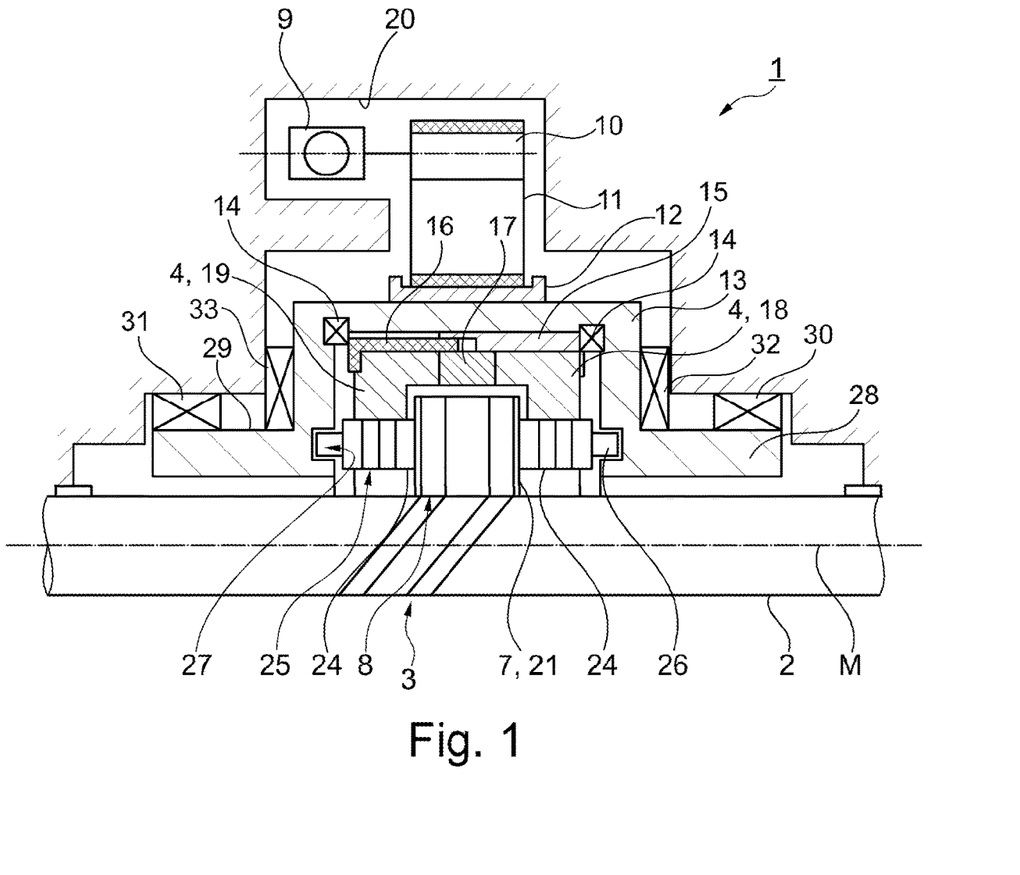
FIG. 1 shows a first exemplary embodiment of an electromechanical actuator of a rear-axle steering system in a schematic sectional illustration.
Figure 2:
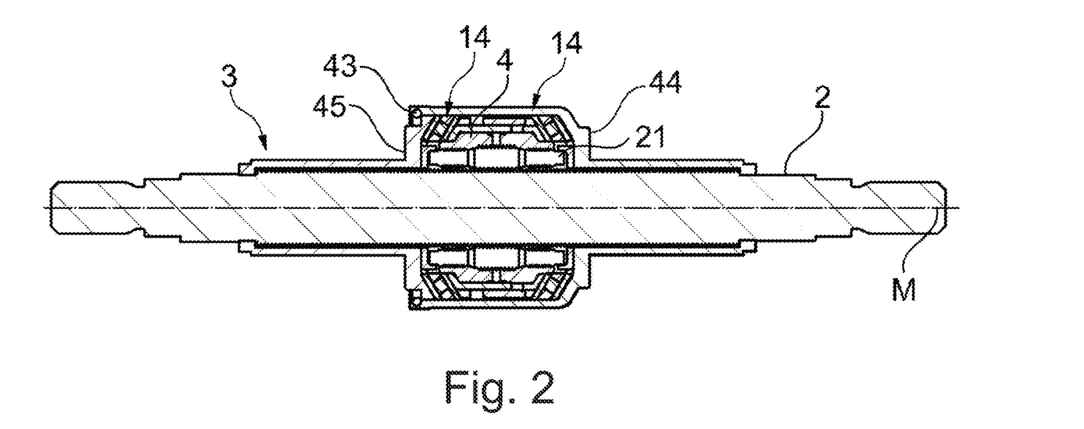
FIG. 2 shows a further, incompletely illustrated exemplary embodiment of an electromechanical actuator of a rear-axle steering system of a motor vehicle in a sectional view.
Figure 3:
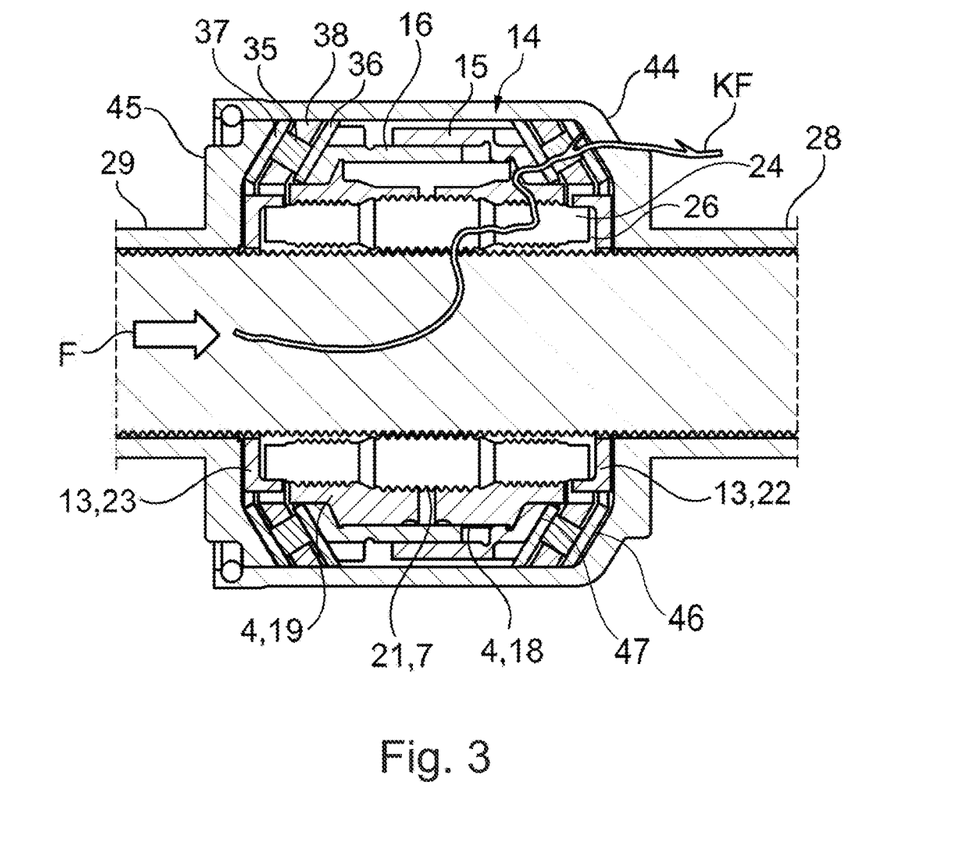
FIG. 3 shows a detail of the arrangement according to FIG. 2.

In the exemplary embodiment according to FIG. 1, the belt pulley 12 directly surrounds the outer surface of the cage 13. Here, a center plane placed through the belt pulley 12 is identical to the center plane of the nut 4 as well as of the cage 13. The cage 13 of the exemplary embodiment according to FIGS. 2 and 3 can also be driven in a corresponding manner. In the case of FIGS. 2 and 3, the cage 13 comprises two outer cage parts 44, 45 which are aligned with one another by means of a snap ring 43. A tubular flange 28, 29 is molded onto each outer cage part 44, 45. The molded tubular flanges 28, 29 are arranged longitudinally outside of the nut 4 and planets 21 and extend in opposite axial directions adjacently to the threaded spindle. In FIG. 3, a flux of force KF is sketched, resulting from a force F introduced into the spindle 2 and acting in the axial direction. As can be seen from FIG. 3, the flux of force KF flows through the planet 21, the nut 4, one of the bearings 14, and from there into the cage 13 and further into the housing 20 via the bearings 30, 32, not shown in FIG. 3. In contrast, no noteworthy axial forces are transmitted via the receptacles 27. In the case of FIGS. 2 and 3, the receptacles 27 are formed by cage rings 22, 23, which are assigned to the cage 13.

Figure 4:
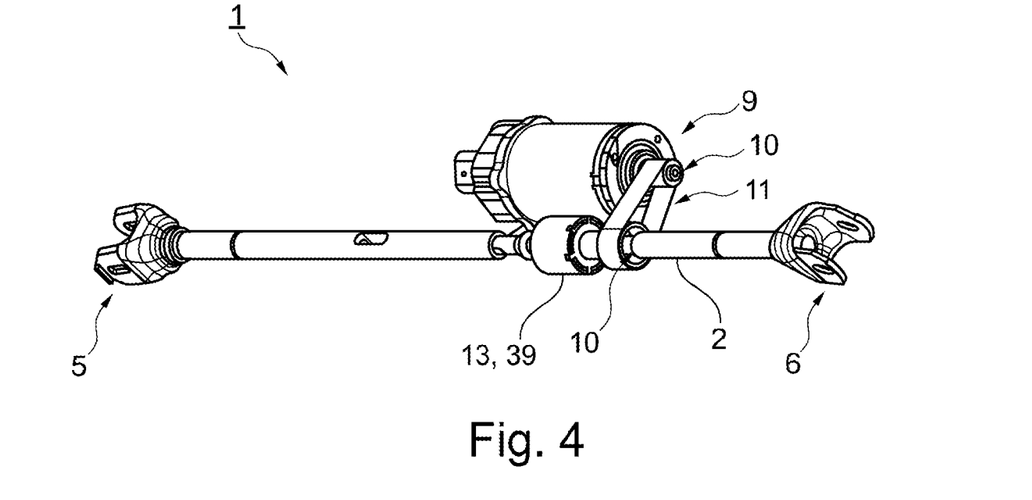
FIG. 4 shows a third exemplary embodiment of an electromechanical actuator in a perspective view.
Figure 5:
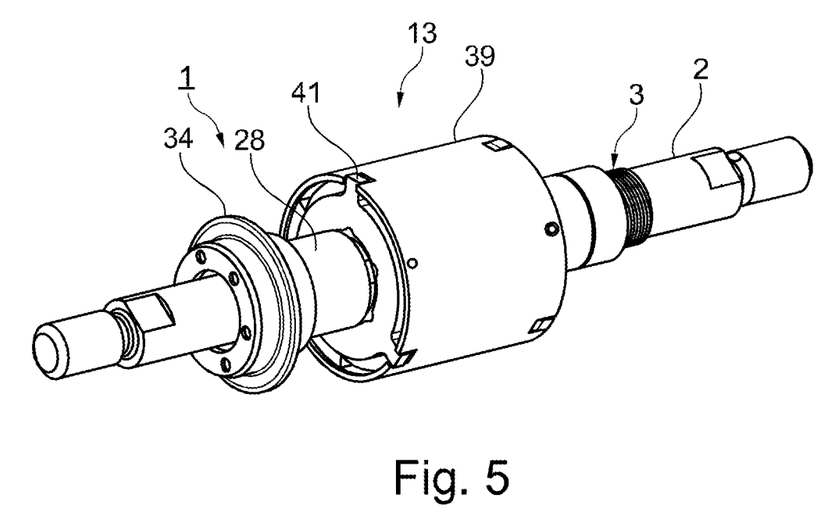
FIG. 5 shows a detail of the arrangement according to FIG. 4.
Figure 6:
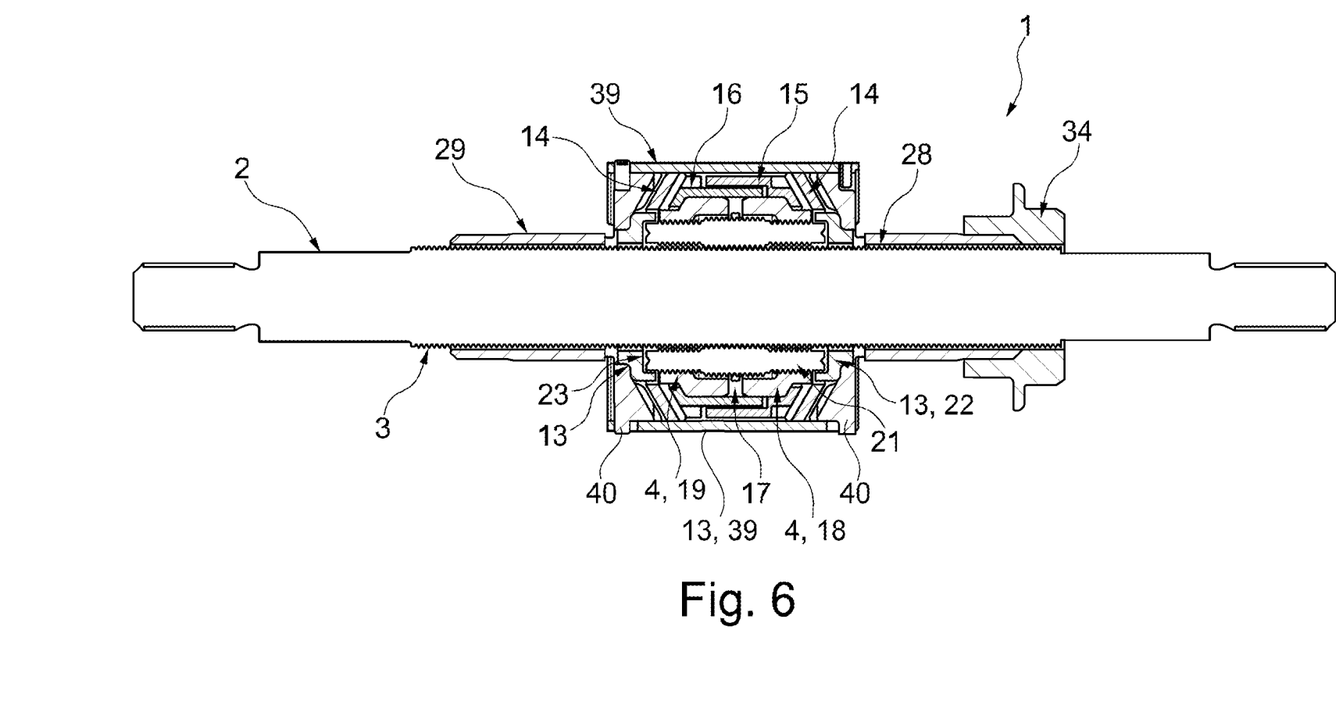
FIG. 6 shows the arrangement according to FIG. 5 in a sectional view.
Figure 7:
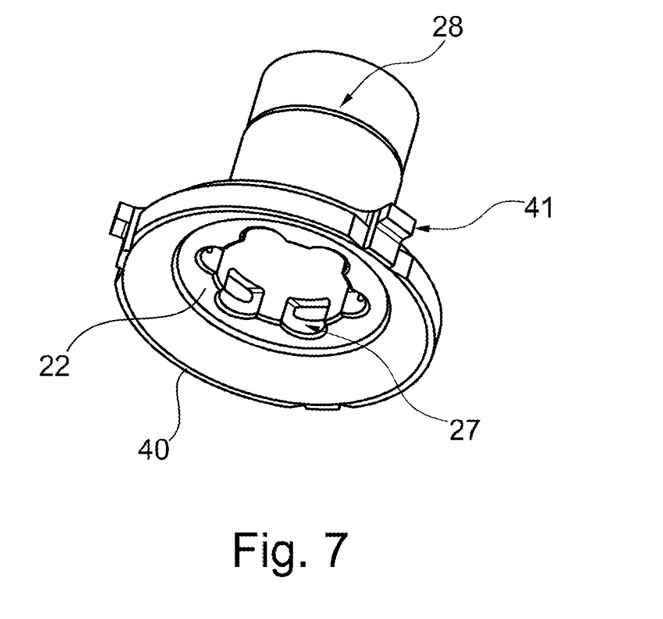
FIG. 7 shows components of the actuator according to FIG. 4 in a perspective view.
Figure 8:
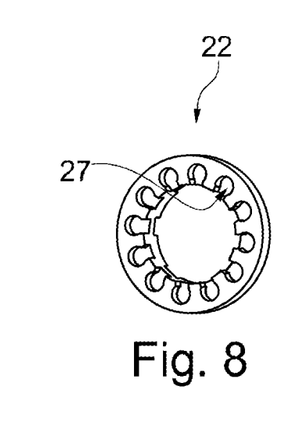
FIGS. 8 to 13 show an individual part of the arrangement according to FIG. 7.
Figure 9:
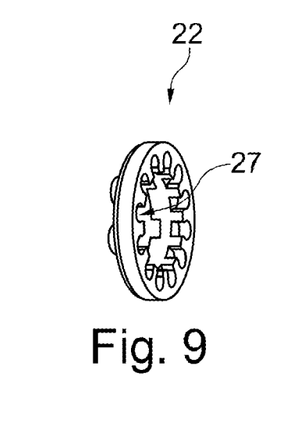
Figure 10:
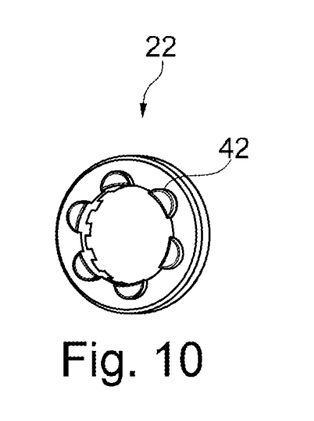
Figure 11:
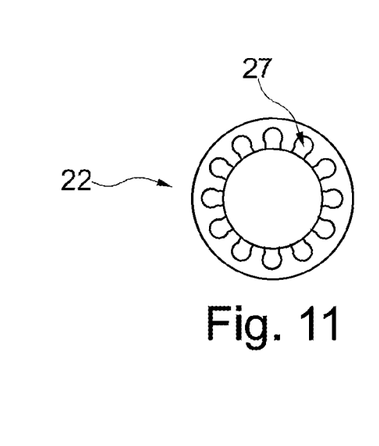
Figure 12:
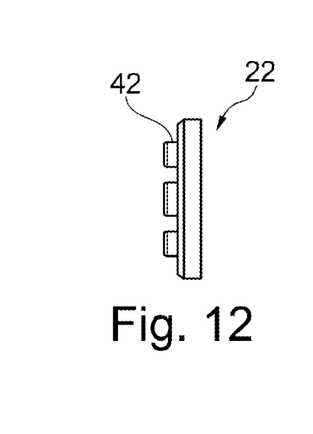
Figure 13:
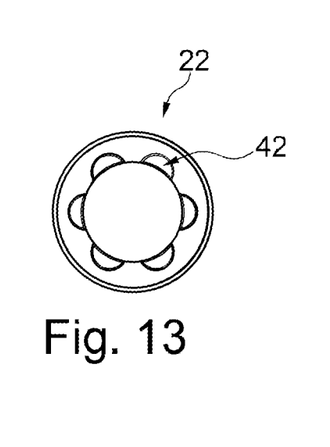

In the exemplary embodiment according to FIGS. 4 to 13, the cage 13 also has two cage rings 22, 23, each forming a plurality of receptacles 27 for the planets 21. In addition to the receptacles 27, the cage rings 22, 23 in this case form form-locking elements 42 which serve to couple with the flanges 28, 29. The flange 28, designed as a separate element in the case of FIG. 5, is non-rotatably connected to a drive element 34, which is thus also non-rotatably coupled to cage 13. The drive element 34 is fixedly connected to the belt pulley 12. The drive element 34 thus represents an element on the output side of the first transmission stage of the actuator 1.

In the case of FIG. 4, the cage 13 comprises an essentially cylindrical cage sleeve 39. Two frontal cage elements 40 each have multiple arms 41 which establish a form-fitting connection with the cage sleeve 39. Axial forces between the essentially annular frontal cage elements 40 can also be transmitted via the cage sleeve 39.

In all of the exemplary embodiments, one revolution of the cage 13 is converted into a feed of the spindle 2 defined in accordance with the pitch of the thread 3. In this sense, the function of a simple movement thread is given. A significant advantage over a simple movement thread, for example a trapezoidal thread, is that the friction is drastically reduced due to the rolling off of the planets 21 on the spindle 2. At the same time, the position of the spindle 2 can be detected in a simple manner by detecting the angular position of the cage 13 or the pinion 10. In contrast, linear position detection is not required for the operation of the rear-axle steering system comprising the actuator 1. The efficiency of the second transmission stage of the actuator 1, designed as a rotary-linear transmission, can be adjusted by changing the setting of the biasing nuts 15, 16, between which a spacer washer 17 (FIG. 1) can be arranged.

LIST OF REFERENCE SIGNS

1 Actuator, drive unit
2 Threaded spindle
3 Thread
4 Nut
5 Connecting element
6 Connecting element
7 Central portion of the planet
8 Profiling of the middle section
9 Electric motor
10 Pinion, drive element
11 Belt
12 Belt pulley, output element
13 Cage
14 Rolling bearing, bearing for mounting the nut in the cage
Biasing nut
16 Biasing nut
17 Spacer washer
18 Nut half
19 Nut half
Housing
21 Planet
22 Cage ring
23 Cage ring
24 Side portion
25 Profiling of the side portion
26 Pins
27 Receptacle
28 Flange
29 Flange
30 Radial bearing
31 Radial bearing
32 Axial bearing
33 Axial bearing
34 Drive element
35 Rolling element, roller
36 Bearing washer
37 Bearing washer
38 Cage of the bearing 14
39 Cage sleeve of the cage 13
40 Frontal cage element
41 Arm
42 Form-fit element
43 Snap ring
44 Outer cage part
45 Outer cage part
46 Tapered surface of cage
47 Tapered surface of nut
F Force
KF Flux of force
M Central axis

The invention claimed is:

1. An electromechanical actuator, comprising:
a threaded spindle having a central axis;
a plurality of planets guided in a driven cage, the plurality of planets having:
    a first profiling configured to engage the threaded spindle;
    a second profiling configured to contact a nut surrounding the plurality of planets; and
    the nut is supported with respect to the driven cage via roller bearings, each roller bearing having:
        a first angled outer bearing washer arranged at an angle relative to the central axis, the first angled outer bearing washer received by a tapered surface of the driven cage;
        a second angled inner bearing washer arranged at an angle relative to the central axis, the second angled inner bearing washer received by a tapered surface of the nut; and
        rollers arranged between the first angled outer bearing washer and the second angled inner bearing washer; and
    the driven cage is non-rotatably connected to an output-side component of a transmission.

2. The electromechanical actuator according to claim 1, wherein the nut comprises two nut halves braced against one another.

3. The electromechanical actuator according to claim 1, wherein the first angled outer bearing washer is fixed to the driven cage, and the second angled inner bearing washer is fixed to the nut.

4. The electromechanical actuator according to claim 1, wherein the transmission is configured as a belt drive continuously variable transmission.

5. The electromechanical actuator according to claim 4, further comprising an electric motor configured to actuate the belt drive continuously variable transmission.

6. The electromechanical actuator according to claim 4, wherein the belt drive continuously variable transmission comprises an output element enclosing a lateral surface of the driven cage.

7. The electromechanical actuator according to claim 4, wherein the belt drive continuously variable transmission comprises an output element connected via a flange to a cage ring guiding the planets and the output element is offset in an axial direction with respect to the cage ring.

8. The electromechanical actuator according to claim 1, wherein the plurality of planets are slidingly mounted in the driven cage.

9. A rear-axle steering system, comprising an electromechanical actuator according to claim 1, the rear-axle steering system configured for a linear deflection of at least one connection element connected to the threaded spindle, the at least one connection element configured for movable coupling with a toe link.

10. An electromechanical actuator, comprising:
a first transmission stage configured to provide a rotary input to a second transmission stage, the second transmission stage comprising:
a threaded spindle;
a cage comprising:
a cylindrical sleeve; and
a first annular frontal cage element arranged at a first end of the cylindrical sleeve and a second annular frontal cage element arranged at a second end of the cylindrical sleeve, the first annular frontal cage element and the second annular frontal cage element having a plurality of radially outwardly extending arms forming a form-fitting connection with the cylindrical sleeve;
a nut: i) disposed within the cylindrical sleeve, ii) supported for rotation with respect to the cage by roller bearings, and iii) having internal annular grooves; and
a plurality of stepped planets supported for rotation with respect to the cage, each planet having a first profiling corresponding to the spindle threads and a second profiling corresponding to the internal annular grooves.

11. The electromechanical actuator according to claim 10, wherein the nut comprises two nut halves braced against one another.

12. The electromechanical actuator according to claim 10, wherein the first transmission stage further comprises:
a motor driving a pinion; and
a belt drivably connecting the pinion to the cage.

13. The electromechanical actuator according to claim 12, wherein the belt drivably connects the pinion to the cage with a continuously variable speed ratio.

14. The electromechanical actuator according to claim 10, wherein the planets are slidingly mounted in the cage.

15. A rear-axle steering system, comprising an actuator according to claim 10, wherein the threaded spindle moves at least one connection element connected for movable coupling with a toe link.

16. The electromechanical actuator according to claim 3, wherein the roller bearings form an X arrangement.

17. The electromechanical actuator according to claim 10, wherein the cylindrical sleeve is configured to transmit an axial force from the first annular frontal cage element to the second annular frontal cage element.

18. The electromechanical actuator according to claim 10, wherein one of the first or second annular frontal cage elements includes axially extending form-locking elements configured to couple with a flange extending axially from the one of the first or second annular frontal cage elements so as to non-rotatably connect the one of the first or second annular frontal cage elements to an output element of the first transmission stage, the output element arranged axially offset with respect to the cage.

19. An electromechanical actuator, comprising:
a threaded spindle;
a housing;
a cage supported for rotation with respect to the housing by first roller bearings, the cage comprising
a first outer cage part aligned with a second outer cage part via a snap ring, and the second outer cage part is disposed within the first outer cage part; and
a nut supported for rotation with respect to the cage by second roller bearings, the nut having internal annular grooves; and
a plurality of stepped planets supported for rotation with respect to the cage, each planet of the plurality of stepped planets having:
a first profiling corresponding to the spindle threads;
a second profiling corresponding to the internal annular grooves;
a first axial end having a first pin arranged within a first receptacle of the first outer cage part;
a second axial end having a second pin arranged within a second receptacle of the second outer cage part;
a first tubular flange molded onto the first outer cage part, the first tubular flange arranged longitudinally outside of the plurality of stepped planets such that the first tubular flange extends adjacently to the threaded spindle and away from the first receptacle in a first axial direction; and
a second tubular flange molded onto the second outer cage part, the second tubular flange arranged longitudinally outside of the plurality of stepped planets such that the first tubular flange extends adjacently to the threaded spindle and away from the second receptacle in a second axial direction.

* * * * *